United States Patent [19]
Davies

[11] Patent Number: 5,408,670
[45] Date of Patent: Apr. 18, 1995

[54] PERFORMING ARITHMETIC IN PARALLEL ON COMPOSITE OPERANDS WITH PACKED MULTI-BIT COMPONENTS

[75] Inventor: Daniel Davies, Palo Alto, Calif.

[73] Assignee: Xerox Corporation, Stamford, Conn.

[21] Appl. No.: 993,925

[22] Filed: Dec. 18, 1992

[51] Int. Cl.$^6$ .............................................. G06F 7/50
[52] U.S. Cl. .................................. 395/800; 364/258.1; 364/DIG. 1
[58] Field of Search ................ 395/800; 364/737, 786, 364/787, 258.1, DIG. 1

[56] References Cited

U.S. PATENT DOCUMENTS

| | | | |
|---|---|---|---|
| 4,474,882 | 5/1984 | Walz | 364/521 |
| 4,608,659 | 8/1986 | Bradley et al. | 364/737 |
| 4,722,066 | 1/1988 | Armer et al. | 364/745 |
| 4,742,552 | 5/1988 | Andrews | 382/41 |
| 4,764,887 | 8/1988 | Lai et al. | 364/787 |
| 4,945,507 | 7/1990 | Ishida | 364/737 |
| 5,129,092 | 7/1992 | Wilson | 395/800 |
| 5,280,547 | 1/1994 | Mahoney | 382/49 |

FOREIGN PATENT DOCUMENTS

| | | |
|---|---|---|
| 0394171 | 10/1990 | European Pat. Off. . |
| 431961A2 | 6/1991 | European Pat. Off. . |
| 460970A2 | 12/1991 | European Pat. Off. . |
| 0464601 | 1/1992 | European Pat. Off. . |
| 0486143 | 5/1992 | European Pat. Off. . |

Primary Examiner—Alyssa H. Bowler
Assistant Examiner—John Harrity

[57] ABSTRACT

Arithmetic operations are performed on composite operands that include plural component data items. The operations obtain valid results even though the operations would ordinarily produce inter-component signals, such as carry or borrow signals or a shifted bit, causing invalid results. For example, the component data items can be pixel values or other data relating to pixels in an image. Instructions on a storage medium can be accessed and executed by a processor to obtain valid results despite intercomponent signals. Or special circuitry, such as gating circuitry or a mask register, can be used to prevent inter-component signals. Components in composite operands can be separated by buffer bits that are cleared or set to ensure valid results. Values of components can be biased before an operation to obtain valid results.

15 Claims, 7 Drawing Sheets

PERFORMING ARITHMETIC IN PARALLEL ON COMPOSITE OPERANDS WITH PACKED MULTI-BIT COMPONENTS

BACKGROUND OF THE INVENTION

The present invention relates to techniques for performing arithmetic operations on data.

Wilson, U.S. Pat. No. 5,129,092 ("Wilson '092"), describes techniques for processing data matrices such as images and spatially related data using neighborhood processing units. As shown and described in relation to FIGS. 1 and 2, the processing units form an array with several groups of eight processing units. Each processing unit's connections to its adjacent processing units to the immediate left and right in the array include a carry in line to its left and a carry out line to the right.

Wilson '092 describes arithmetic operations beginning at col. 12 line 40. In bit serial arithmetic, a carry signal from a carry flip-flop is passed to multiplexers, one of which acts as a truth table for a carry propagate value, which is stored in flip-flops, provided to an output selector, and can be read back to memory. In parallel arithmetic, a carry input from a processing unit to the immediate left is obtained and a carry output propagates to a processing unit to the immediate right. When performing parallel arithmetic operations, care must be used in writing algorithms in order to avoid overflow, so that carry signals will not accidentally propagate from one data word to the next, since many data words are on the same line of bits.

Mahoney, EP-A 460 970, describes techniques for operating on a body of data such as data defining an image. FIG. 7 shows a Connection Machine system that performs image processing by simulating a binary image jungle (BIJ). A front end processor can make calls to cause processing units in the Connection Machine to perform arithmetic and logical operations. FIG. 8 illustrates a part of an array of processing units in a Connection Machine, with a processing unit storing a pixel value of an image at a lowest level of a BIJ and receiving a pixel value from another processing unit at the next higher level of the BIJ. As described at page 20 lines 15–28 in relation to FIG. 10, each processing unit operates on the results from the next lower level of its first and second children. FIGS. 13 and 14 each show a sequence of data item arrays in which sums of pixel values are obtained. As described in relation to FIG. 18, each processing unit's local memory can contain a respective pixel's value.

SUMMARY OF THE INVENTION

The invention deals with a problem in processing multi-bit data items, such as gray scale or color pixel values.

As described by Wilson '092, bit serial arithmetic can be used for operations on multi-bit words. But it is often more efficient to operate on multi-bit data items in horizontal format, to avoid corner turning between horizontal and vertical formats. At the same time, a processor may be designed to operate on a unit of data much wider than one data item width, so that operating on one data item at a time would also be inefficient.

Some operations, referred to herein as "logic operations," obtain one result bit using each operand bit. Therefore, a logic operation produces valid results when performed in parallel on a composite operand that includes a plurality of component data items. Examples include NOT, AND, OR, and XOR.

In contrast, ordinary arithmetic operations can obtain a result with more bits than the values on which the operations are performed. For example, adding two K-bit values can produce a (K+1)-bit result because of a carry signal. Subtracting one K-bit value from another that is smaller can result in a borrow signal to the (K+1)th bit. Multiplying two K-bit values can produce a 2K-bit result. And division can sometimes produce an unlimited number of bits if not truncated at some level of precision.

Because results of greater width could be produced, conventional processors cannot perform ordinary arithmetic operations in parallel on composite operands that include plural component data items such as pixel values. An operation on one component may produce an inter-component signal, such as a carry signal, a borrow signal, or a shift, that propagates or overflows into the next component, invalidating the result obtained from the next component. If the components are bits, logic operations can be used rather than arithmetic operations to solve this problem. But if the components contain more than one bit, logic operations cannot satisfactorily replace arithmetic operations.

The invention is based on the discovery of techniques for performing arithmetic operations in parallel on composite operands that include plural multi-bit component data items. For example, each component could relate to a pixel of an image; the components can be gray scale or color pixel values. Although the arithmetic operations would ordinarily produce signals between components, referred to herein as "inter-component signals," that would cause invalid results, the techniques of the invention produce valid results. Some techniques use a processor with special circuitry that can prevent inter-component signals. Others, which can use a conventional processor, obtain valid results of an arithmetic operation despite inter-component signals.

Each technique that can use a conventional processor can be implemented in an article of manufacture. The article includes a data storage medium and instruction data stored by the data storage medium, which could be a magnetic storage medium, an optical storage medium, a semiconductor memory, or other memory medium. The article can be used in a system that includes memory, a storage medium access device, and a processor. The memory stores multi-bit data items, such as data relating to pixels of an image. The instruction data indicate instructions a processor can execute to perform an arithmetic operation in parallel on a composite operand that includes more than one of the multi-bit data items. The instructions ensure that the results obtained are valid despite inter-component signals. The instruction data can be, for example, code that can be executed by a microprocessor such as the CPU of a conventional workstation or other computer.

One special circuitry technique uses a processor with gating circuitry that can be used to control transfer of signals between component data items. This technique can use conventional microprocessors if the maximum component width is an integer multiple of the microprocessor width.

Another special circuitry technique uses a processor with a mask register connected to the processing circuitry. The mask register could be loaded with an allow value, such as ON, in bit positions that are allowed to receive inter-component signals from the next lower bit positions. The mask register could be loaded with a prevent value, such as OFF, in bit positions that are not allowed to receive inter-component signals from the next lower bit positions. The mask register could be loaded each time component width changes, allowing many component widths. Also, for operations on data other than composite operands, the mask register can be loaded with values that permit inter-component signals to propagate freely.

One technique that can use a conventional processor uses one or more buffer bits between each pair of adjacent component data items. For example, a buffer bit could be annexed to every component, above its most significant bit or below its least significant bit. Or, if precision can be sacrificed, the least significant bit of each component could be a buffer bit. The values of the buffer bits can then be manipulated to prevent or compensate for inter-component signals.

An addition operation can clear all buffer bits before adding composite operands. For example, if the operation adds pairs of components, each composite operand can be ANDed with a mask having an OFF value in each buffer bit and an ON value elsewhere. If the operation adds a constant to every component, a constant operand can be formed by replicating the constant separated by buffer bits that have an OFF value.

A subtraction operation can use a buffer bit above each component's most significant bit. To ensure valid results, each buffer bit in a composite minuend can have ON values and each buffer bit in a composite subtrahend can start with an OFF value. In effect, the buffer bits ensure that each component of the minuend has a value exceeding the aligned component of the subtrahend. As a result, a borrow signal cannot propagate to the next component's result.

Multiplication and division can be implemented with addition and subtraction, together with shifting and logic operations using masks. The buffer bits can be used to generate the masks.

The buffer bit technique can also be implemented using special circuitry that inserts buffer bits between component data items.

Another technique that can use a conventional processor can be used to reduce or eliminate buffer bits for certain arithmetic operations. This technique prepares composite operands for an addition operation by adjusting values indicated by component data items. For example, if it can be predicted that a certain component's value will cause an inter-component carry signal, the component adjacent its most significant bit can be adjusted by subtracting one from it prior to the operation, so that the inter-component carry signal has no effect.

The techniques of the invention are advantageous because they provide a range of alternatives, each of which is useful in appropriate situations. Each technique can ensure that inter-component signals do not invalidate results of an arithmetic operation performed in parallel on composite operands with plural multi-bit component data items such as pixel values. In addition, some of the techniques can be used together in certain situations. As a result of the invention, arithmetic operations on multi-bit component data items can be performed rapidly and efficiently in many situations.

The following description, the drawings, and the claims further set forth these and other aspects, objects, features, and advantages of the invention.

DETAILED DESCRIPTION

A. Conceptual Framework

The following conceptual framework is helpful in understanding the broad scope of the invention, and the terms defined below have the indicated meanings throughout this application, including the claims.

The term "data" refers herein to physical signals that indicate or include information. When an item of data can indicate one of a number of possible alternatives, the item of data has one of a number of "values." For example, a binary item of data, also referred to as a "bit," has one of two values, interchangeably referred to as "1" and "0" or "ON" and "OFF" or "high" and "low." A bit is an "inverse" of another bit if the two bits have different values. An N-bit item of data has one of $2^N$ values.

A "multi-bit" item of data is an item of data that includes more than one bit.

The term "data" includes data existing in any physical form, and includes data that are transitory or are being stored or transmitted. For example, data could exist as electromagnetic or other transmitted signals or as signals stored in electronic, magnetic, or other form.

"Circuitry" or a "circuit" is any physical arrangement of matter that can respond to a first signal at one location or time by providing a second signal at another location or time. Circuitry "stores" a first signal when it receives the first signal at one time and, in response, provides substantially the same signal at another time. Circuitry "transfers" a first signal when it receives the first signal at a first location and, in response, provides substantially the same signal at a second location.

A "data storage medium" or "storage medium" is a physical medium that can store data. Examples of data storage media include magnetic media such as floppy disks, optical media such as CD-ROMs, and semiconductor media such as semiconductor ROMs and RAMs.

As used herein, "storage medium" covers one or more distinct units of a medium that together store a body of data. For example, a set of floppy disks storing a single body of data would be a storage medium.

A "storage medium access device" is a device that includes circuitry that can access data on a data storage medium. Examples include floppy disk drives and CD-ROM readers.

"Memory circuitry" or "memory" is any circuitry that can store data, and may include local and remote memory and input/output devices. Examples include semiconductor ROMs, RAMs, and storage medium access devices with data storage media that they can access. A "memory cell" is memory circuitry that can store a single unit of data, such as a bit or other n-ary digit or an analog value.

An operation or a signal "writes" or "sets" memory circuitry or a memory cell by storing data in the memory circuitry or memory cell. If the data stored are different than data previously stored in the memory circuitry or memory cell, the operation or signal "changes" the data. An operation or a signal "reads" memory circuitry or a memory cell by producing data indicating the value of data currently stored in the memory circuitry or memory cell. Memory circuitry or a memory cell is "accessed" by any operation or signal that reads or writes the memory circuitry or memory cell. An item of data currently stored in memory circuitry or a memory cell is "accessed" by an operation or signal that reads the item of data or that writes another item of data, possibly identical to the current item of data, in place of the current item of data. An operation or signal "addresses" a memory cell within memory circuitry that includes plural memory cells by selecting the memory cell to be accessed. An operation or signal "enables" an access operation by putting memory circuitry or memory cell into a state in which it can be read or written.

An "array" of memory cells is a number of memory cells that are addressed or accessed in an interdependent manner.

A "register" is memory circuitry that includes an array of memory cells for temporary storage of data. A "shift register" is a register in which the data stored in each of the memory cells can be shifted along a dimension of the array to a next memory cell. If the shift register includes a one-dimensional array of memory cells, each storing a bit of data, the shifting operation can receive and store a series of bits of data or it can provide a series of bits of data as output.

A "processor" is any circuitry that can process data, and may include one or more central processing units or other processing components. A "processing unit" is a processor that is a component within another processor. "Processing circuitry" is circuitry within a processor or processing unit that processes data. A "microprocessor" is a processor in the form of circuitry on a substrate.

A processor or other component of circuitry "operates on" an item of data by performing an operation that includes obtaining a resulting item of data that depends on the item of data operated on. For example, the resulting item of data could result from an operation that accesses the item of data operated on or from a logical or numerical operation on the item of data operated on.

An "operand" is an item of data on which an operation is performed.

An operation is performed "using an operand" when the operation is performed on the operand.

An "arithmetic operation" is an operation that obtains a numerical result that depends on the value of an operand. Addition, subtraction, multiplication, and division are examples of arithmetic operations.

A "logic operation" is an operation that obtains one bit using each bit of an operand independent of values of other bits of the operand. NOT is an example of a logic operation that uses one operand. OR, AND, and XOR are examples that use two or more operands. Some arithmetic operations can be efficiently implemented using logic operations, but others include carrying, borrowing, or shifting, making such implementation difficult.

A processor or other circuitry performs an operation "in parallel" on an operand that includes plural bits when a result is obtained for all of the bits at approximately the same time. The amount of time required may, for example, be a single clock cycle of a processor.

A "composite operand" is an operand that includes two or more data items, referred to as "component data items" or "components."

A processor or other circuitry performing an arithmetic operation on a composite operand may produce an "inter-component signal." An inter-component signal is a signal like a carry signal, a borrow signal, or a shifted bit that may cause an operation on one component to affect results obtained for another component.

An arithmetic operation "would ordinarily produce an inter-component signal from a component data item" if the operation performed according to ordinary arithmetic produces an inter-component signal whose effect extends outside the component data item. Adding one to a two-bit component data item with the value 11, for example, would ordinarily produce an inter-component carry signal affecting the next bit to the left.

An arithmetic operation on a data item obtains or produces "a resulting data item indicating a valid result" or simply "a valid result" when the resulting data item indicates the numerical value that would be produced by ordinary arithmetic. Otherwise the operation produces "an invalid result."

A "processing position" is a part of a processor or processing circuitry that can perform an operation on one bit.

"Position connecting circuitry" is circuitry that connects processing positions. For example, position connecting circuitry could connect processing positions "to form an array," such as by connecting the processing positions in pairs so that a signal from one processing position in each pair can be transferred to the other.

A "subarray of processing positions" is a subset of processing units within an array that are connected by position connecting circuitry so that the subarray can perform an arithmetic operation on a data item in parallel.

A binary number can be represented as a sum of powers of two. Each bit in the binary number indicates presence or absence of a particular power of two in the sum. Therefore, the "most significant bit" or "MSB" of a binary number is the bit that indicates presence or absence of the largest power of two and the "least significant bit" or "LSB" is the bit that indicates presence or absence of the smallest power of two. For example, if the binary number includes K bits and the powers of two in the sum range from $2^0$ to $2K-1$, the MSB indicates whether the binary number is at least as great as $2^K - 1$ and the LSB indicates whether the binary number is even or odd. In general, the MSB can indicate a binary number's sign, or, if sign is not ambiguous, whether the number is in the upper or lower half of a range of possible values.

Conventionally, the bits of a binary number are ordered in sequence from MSB to LSB or vice versa. As used herein, "left" and "leftward" arbitrarily refer to a direction toward an MSB in sequence while "right" and "rightward" arbitrarily refer to a direction toward an LSB in sequence.

The "most significant bit position" of a subarray of processing positions operating on a binary number is a position operating on the MSB of the binary number. The "least significant bit position" of a subarray of processing positions operating on a binary number is a position operating on the LSB of the binary number.

An inter-component signal provided by a first subarray of processing positions is "capable of causing" an operation to obtain a data item indicating an invalid result in a second subarray if position connecting circuitry connects the subarrays so that the signal can propagate from the first subarray to the second, directly or through one or more intermediate processing positions.

A processor or processing circuitry acts "to ensure" that a data item in a subarray indicates a valid result of an arithmetic operation despite an inter-component signal when the processor or processing circuitry performs the operation in a way that ensures that the data item indicates a valid result.

"Inter-component prevent circuitry" is circuitry that can prevent transfer of signals, such as inter-component signals, between processing positions in a processor or processing circuitry through position connecting circuitry.

A processor or other component of circuitry "uses" an item of data in performing an operation when the result of the operation depends on the value of the item. For example, the operation could perform a logic or arithmetic operation on the item or could use the item to access another item of data.

An "instruction" is an item of data that a processor can use to determine its own operation. A processor "executes" a set of instructions when it uses the instructions to determine its operations. Execution of instructions "causes" a processor to perform an operation when the processor performs the operation in the process of executing the instructions.

To "obtain" or "produce" an item of data is to perform any combination of operations that begins without the item of data and that results in the item of data. An item of data can be "obtained" or "produced" by any operations that result in the item of data. An item of data can be "obtained from" or "produced from" other items of data by operations that obtain or produce the item of data using the other items of data.

A first item of data "indicates" a second item of data when the second item of data can be obtained from the first item of data. The second item of data can be accessible using the first item of data. Or the second item of data can be obtained by decoding the first item of data. Or the first item of data can be an identifier of the second item of data. For example, an item of data may indicate a set of instructions a processor can execute or it may indicate an address.

"Code" means data indicating instructions, but in a form that a processor can execute.

An operation or event "transfers" an item of data from a first component to a second if the result of the operation or event is that an item of data in the second component is the same as an item of data that was in the first component prior to the operation or event. The first component "provides" the data, and the second component "receives" or "obtains" the data.

An "image" is a pattern of light.

An image may be divided into "segments," each of which is itself an image. A segment of an image may be of any size up to and including the whole image.

An "array of data" or "data array" or "array" is a combination of items of data that can be mapped into an array. A "two-dimensional array" is a data array whose items of data can be mapped into an array having two dimensions.

An item of data "defines" an image when the item of data includes sufficient information to produce the image. For example, a two-dimensional array can define all or any part of an image, with each item of data in the array providing a value indicating the color of a respective location of the image.

A "pixel" is the smallest segment of an image whose value is indicated in an item of data defining the image. In an array defining an image in which each item of data provides a value indicating a color, each value may be called a "pixel value". Each pixel value is a bit in the "binary form" of the image, a gray scale value in a "gray scale form" of the image, or a set of color space coordinates in a "color coordinate form" of the image, the binary form, gray scale form, and color coordinate form each being a two-dimensional array defining the image.

An item of data "relates to" part of an image, such as a pixel or a larger segment of the image, when the item of data has a relationship of any kind to the part of the image. For example, the item of data could define the part of the image, as a pixel value defines a pixel; the item of data could be obtained from data defining the part of the image; the item of data could indicate a location of the part of the image; or the item of data could be part of a data array such that, when the data array is mapped onto the image, the item of data maps onto the part of the image.

An operation performs "image processing" when it operates on an item of data that relates to part of an image.

A first component provides a signal to a plurality of other components "in parallel" when all of the other components receive the signal from the first component at approximately the same time.

An operation or component can provide or transfer an item of data to a single receiving component "in parallel" if the item of data includes a plurality of bits and the receiving component receives all of the bits at approximately the same time.

"Control circuitry" is circuitry that provides data or other signals that determine how other components operate. For example, "instruction circuitry" is control circuitry that provides items of data indicating instructions to a component that includes processing circuitry. Similarly, "addressing circuitry" is control circuitry that provides items of data indicating addresses to a component that includes memory circuitry.

A first component "controls" a second component when signals from the first component determine how the second component operates.

Signals "cause" or "control" an operation of a component if the signals determine how the operation is performed.

Any two components are "connected" when there is a combination of circuitry that can transfer signals from one of the components to the other. For example, two components are "connected" by any combination of connections between them that permits transfer of signals from one of the components to the other. Similarly, a plurality of components are "interconnected" when each component is connected to every other component in the plurality through some combination of connections.

"Connecting circuitry" is circuitry that connects two or more components.

A "parallel processor" is a processor that includes more than one processing unit, each able to perform operations on data in parallel with the others.

B. General Features

Figure 1:
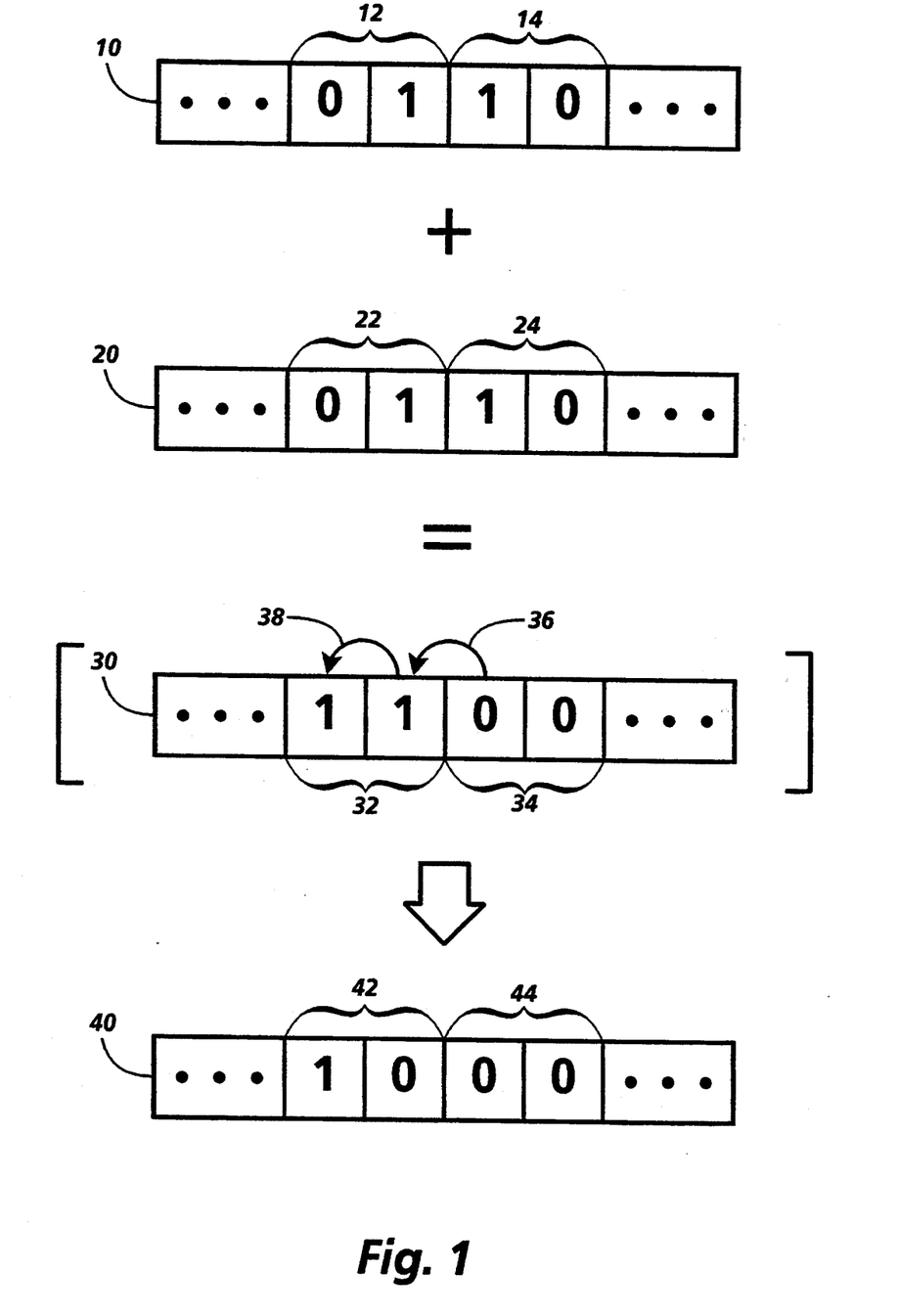
FIG. 1 is a schematic diagram showing how a valid result of an arithmetic operation on each component of a composite operand can be obtained even though the operation would ordinarily produce an inter-component signal causing an invalid result.
Figure 2:
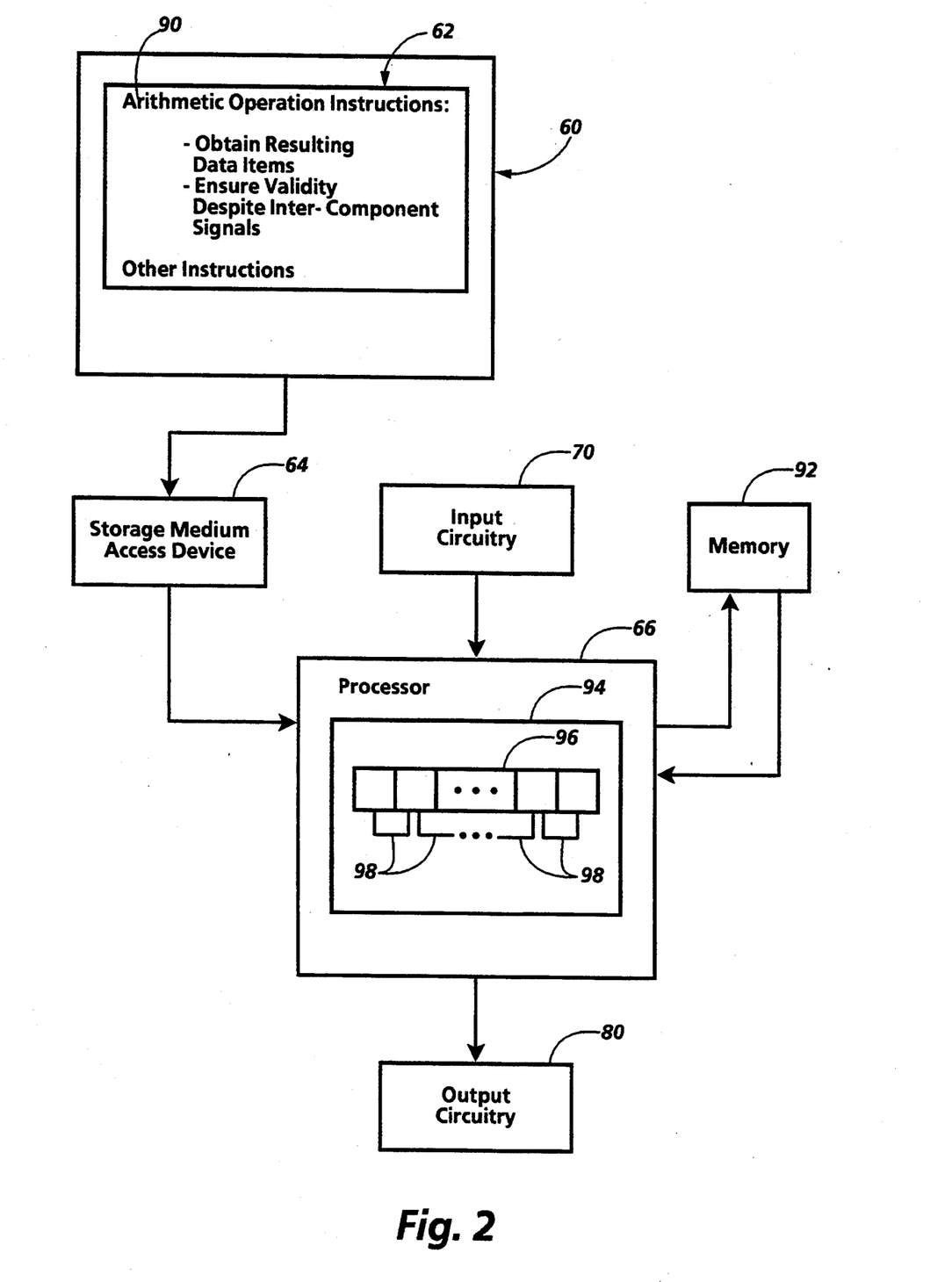
FIG. 2 is a schematic block diagram showing components of a system in which a processor can execute instructions from a software product to obtain valid results of an arithmetic operation despite inter-component signals.
Figure 3:
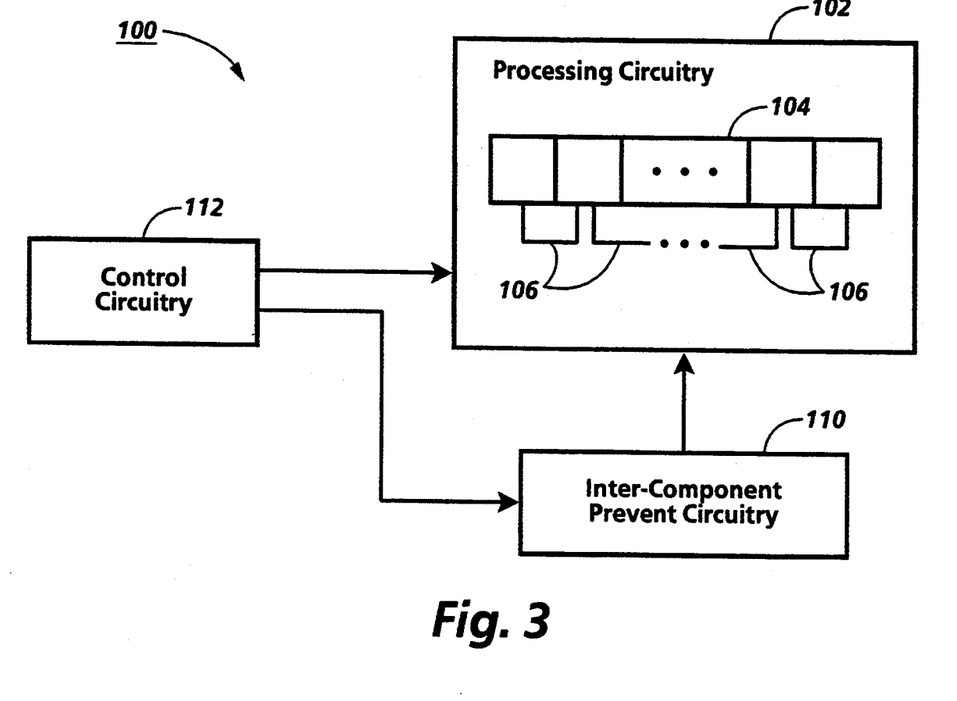
FIG. 3 is a schematic block diagram showing a processor that includes inter-component prevent circuitry that can prevent inter-component signals.
Figure 4:
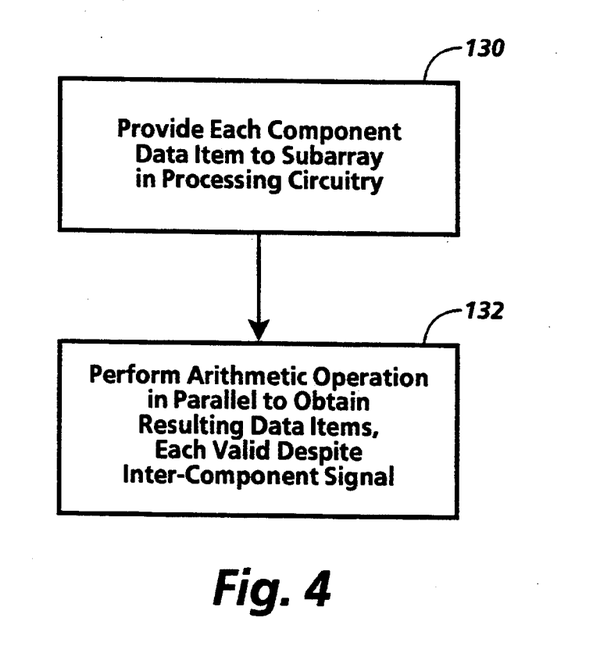
FIG. 4 is a flow chart showing acts by which a processor can obtain valid results despite inter-component signals.

FIGS. 1–4 illustrate general features of the invention. FIG. 1 shows schematically a technique that obtains a valid result of an arithmetic operation performed in parallel on multi-bit component data items. FIG. 2 shows a software product with instruction data indicating instructions a processor can perform in accordance with a technique like that in FIG. 1. FIG. 3 shows general features of a processor with inter-component prevent circuitry to prevent transfer of inter-component signals between processing positions. FIG. 4 shows general acts in a method of operating a processor to obtain valid results despite an inter-component signal.

In FIG. 1, composite operand 10 includes component data items 12 and 14, each including two bits. Component 12 has the value 01, while component 14 has the value 10. Similarly, composite operand 20 includes components 22 and 24, with the respective values 01 and 10.

Components 12 and 22 can occupy the same bit positions and components 14 and 24 similarly can occupy the same bit positions. The most significant bits of components 12 and 22 can be adjacent respectively to the least significant bits of components 12 and 22. Therefore, when a processor performs an arithmetic operation adding operand 10 to operand 20, components 12 and 22 are added and components 14 and 24 are added.

An ordinary arithmetic operation of addition performed on composite operands 10 and 20 by a conventional processor can produce result 30. As shown, result 30 includes data items 32 and 34, with the values 11 and 00 respectively. The "1" values in data item 32 both result from carry signals, carry signal 36 from the most significant bit of components 14 and 24 and carry signal 38 from the least significant bit of components 12 and 22. As can be seen, however, carry signal 36 causes an invalid result in data item 32, because the sum of 01 and 01 is 10, not 11.

In order to avoid invalid result 30, the processor can instead produce valid result 40, in which data items 42 and 44 have the values 10 and 00 respectively. Various specific techniques for producing a valid result where an inter-component signal would ordinarily lead to an invalid result are set forth below.

FIG. 2 shows software product 60, an article of manufacture that can be used in a system that includes components like those shown in FIG. 2. Software product 60 includes data storage medium 62 that can be accessed by storage medium access device 64. Data storage medium 62 could, for example, be a magnetic medium such as a set of one or more floppy disks, an optical medium such as a set of one or more CD-ROMs, semiconductor memory, or any other appropriate medium for storing data.

Data storage medium 62 stores data that storage medium access device 64 can provide to processor 66, which could for example be a microprocessor. Processor 66 is connected for receiving data from input circuitry 70. The data could be obtained from any appropriate source, such as a facsimile (fax) machine; a scanner, which could be the scanner of a digital copier or an input/output device of a computer; an editor, which could be a forms editor or other interactive image editor controlled by user input devices such as a keyboard and mouse or a pen- or stylus-based input device; or a network, which could be a local area network or other network capable of transmitting data. The data could relate to an image.

Processor 66 is also connected for providing data to output circuitry 80. The data could in turn be provided to a fax machine, a printer, a display, or a network. The printer could be the printer of a digital copier or an input/output device of a computer.

In addition to data storage medium 62, software product 60 includes data stored by storage medium 62. The stored data include instruction data indicating arithmetic operation instructions 90. Processor 66 can execute instructions 90 to perform an arithmetic operation on a composite operand that includes a plurality of component data items.

Processor 66 can obtain the component data items on which the arithmetic operation is performed by accessing memory 92. Each item of data can, for example, relate to a pixel of an image. The items of data can each include more than one bit. The data stored by storage medium 62 could also include data indicating instructions processor 66 can execute to store data items received from input circuitry 70 in memory 92, to retrieve data items from memory 92 for an arithmetic operation or to be provided to output circuitry 80, or to store data items resulting from an arithmetic operation in memory 92.

Processor 66 includes processing circuitry 94 with plural processing positions 96. Processor 66 could, for example, be a conventional microprocessor. Each of processing positions 96 can perform an operation on one bit. Processing circuitry 94 includes position connecting circuitry 98 connecting processing positions 96 in pairs to form an array. A signal from one processing position in a pair can be transferred by position connecting circuitry 98 to the other processing unit.

Each component data item in a composite operand on which an arithmetic operation is being performed can be in a respective subarray of processing positions 96. Processor 66 can execute arithmetic operation instructions 90 to obtain a resulting data item in each component's subarray. During execution of arithmetic operation instructions 90, the subarray of a first component provides an inter-component signal to position connecting circuitry 98. The inter-component signal is capable of causing the arithmetic operation to obtain a resulting data item indicating an invalid result in the subarray of a second component. Processor 66, in executing arithmetic operation instructions 90, acts to ensure that the resulting data item in the second component's subarray indicates a valid result of the arithmetic operation on the second component, despite the inter-component signal.

FIG. 3 shows general components of processor 100. Processing circuitry 102 can perform arithmetic operations in parallel on composite operands. Like processing circuitry 94 in FIG. 2, processing circuitry 102 has plural processing positions 104. Each of processing positions 104 can perform an operation on one bit. Processing circuitry 102 includes position connecting circuitry 106 connecting processing positions 104 in pairs to form an array. A signal from one processing position in a pair can be transferred by position connecting circuitry 106 to the other processing unit.

Processor 100 is not, however, a conventional microprocessor. Inter-component prevent circuitry 110 is connected so that it can prevent transfer of signals between processing positions 104 through position connecting circuitry 106.

Control circuitry 112 is connected to provide control signals to processing circuitry 102 and inter-component prevent circuitry 110.

The control signals cause processing circuitry 102 to perform an arithmetic operation in parallel on a composite operand that includes plural multi-bit component data items. For example, each component data item can relate to a pixel of an image. Each component is in a respective subarray of processing positions 104. Processing circuitry 102 performs the arithmetic operation on each component to obtain a resulting data item in each component's subarray. During performance of the arithmetic operation, the subarray of a first component provides an inter-component signal to position connecting circuitry 106. The inter-component signal is capable of causing the arithmetic operation to obtain a resulting data item indicating an invalid result in the subarray of a second component.

The control signals also cause inter-component prevent circuitry 110 to prevent transfer of the inter-component signal by position connecting circuitry 106. As a result, the resulting data item in the second component's subarray indicates a valid result of the arithmetic operation on the second component.

FIG. 4 shows general acts in a method of operating a processor with processing circuitry like processing circuitry 94 in FIG. 2. The act in box 130 provides an composite operand to processing circuitry 94, with each component being provided to a respective subarray of processing positions 96. The act in box 132 operates processing circuitry 94 to perform an arithmetic operation in parallel on the composite operand to obtain a resulting data item in each subarray. During performance of the arithmetic operation, the subarray of a first component provides an inter-component signal. The act in box 132 is performed so as to ensure that each resulting data item indicates a valid result despite the inter-component signal.

C. Implementations

The general features described above in relation to FIGS. 1-4 could be implemented in many different ways with a wide variety of components and with various operations. For example, some of the general features described above have been implemented with conventional processors while others could be implemented with specially designed processors, such as a parallel processor with the features described in copending coassigned U.S. patent application Ser. No. 07/933,218, pending, entitled "SIMD Architecture with Bus for Transferring Data to and from Processing Units," and U.S. patent application Ser. No. 07/993,256, pending, entitled "SIMD Architecture for Connection to Host Processor's Bus," both incorporated herein by reference.

Figure 5:
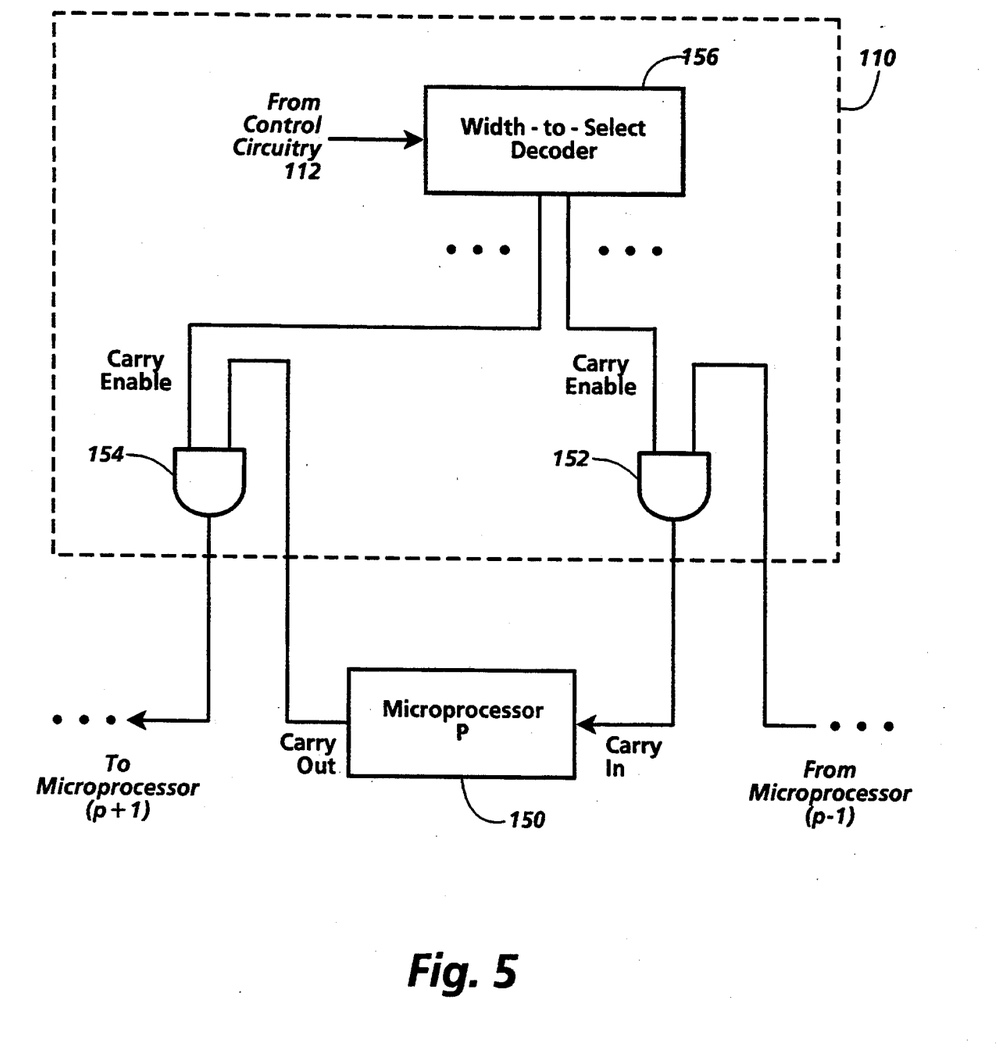
FIG. 5 is a schematic circuit diagram showing gating circuitry implementing the inter-component prevent circuitry of FIG. 3.
Figure 6:
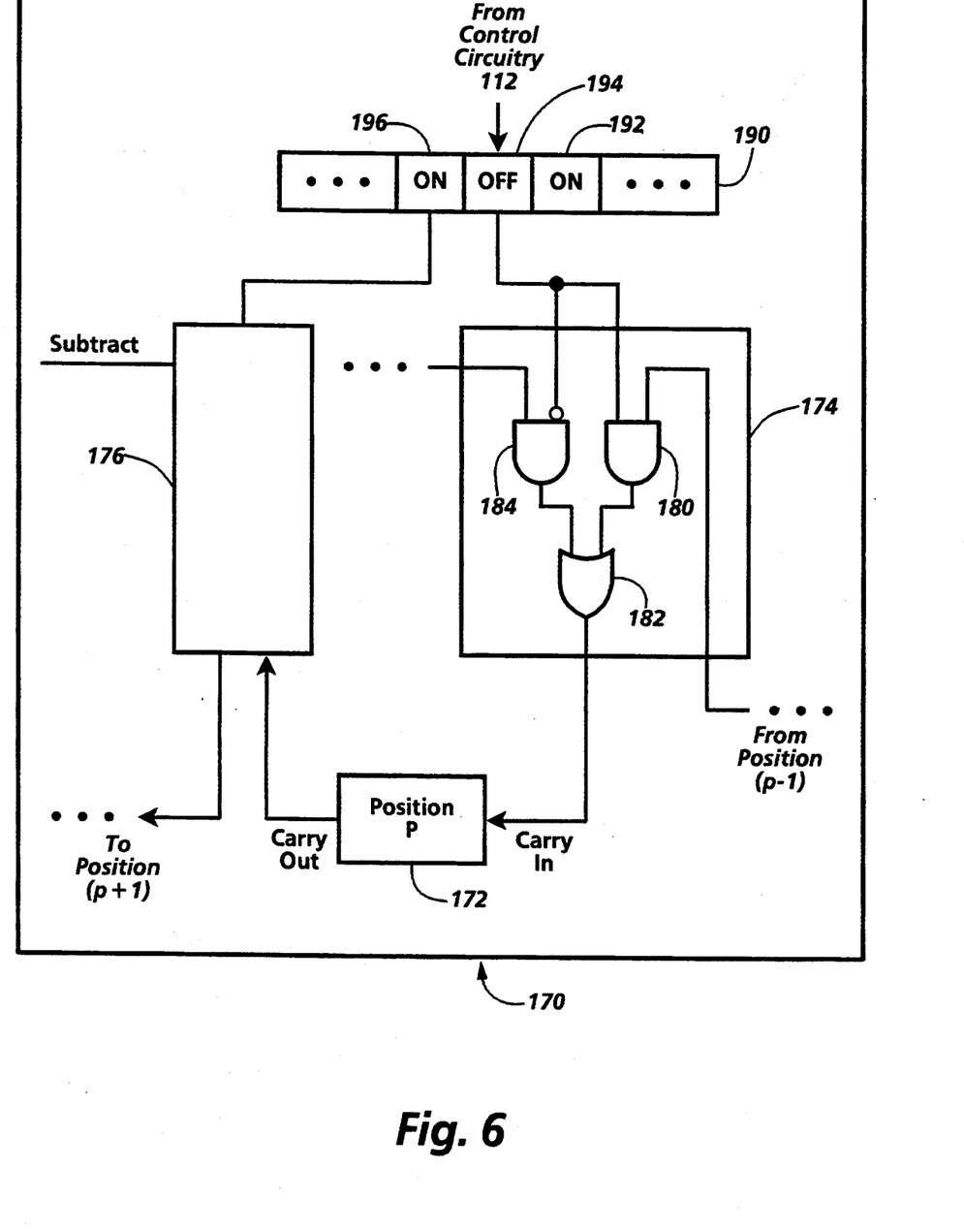
FIG. 6 is a schematic circuit diagram showing mask register circuitry implementing the inter-component prevent circuitry of FIG. 3.
Figure 7:
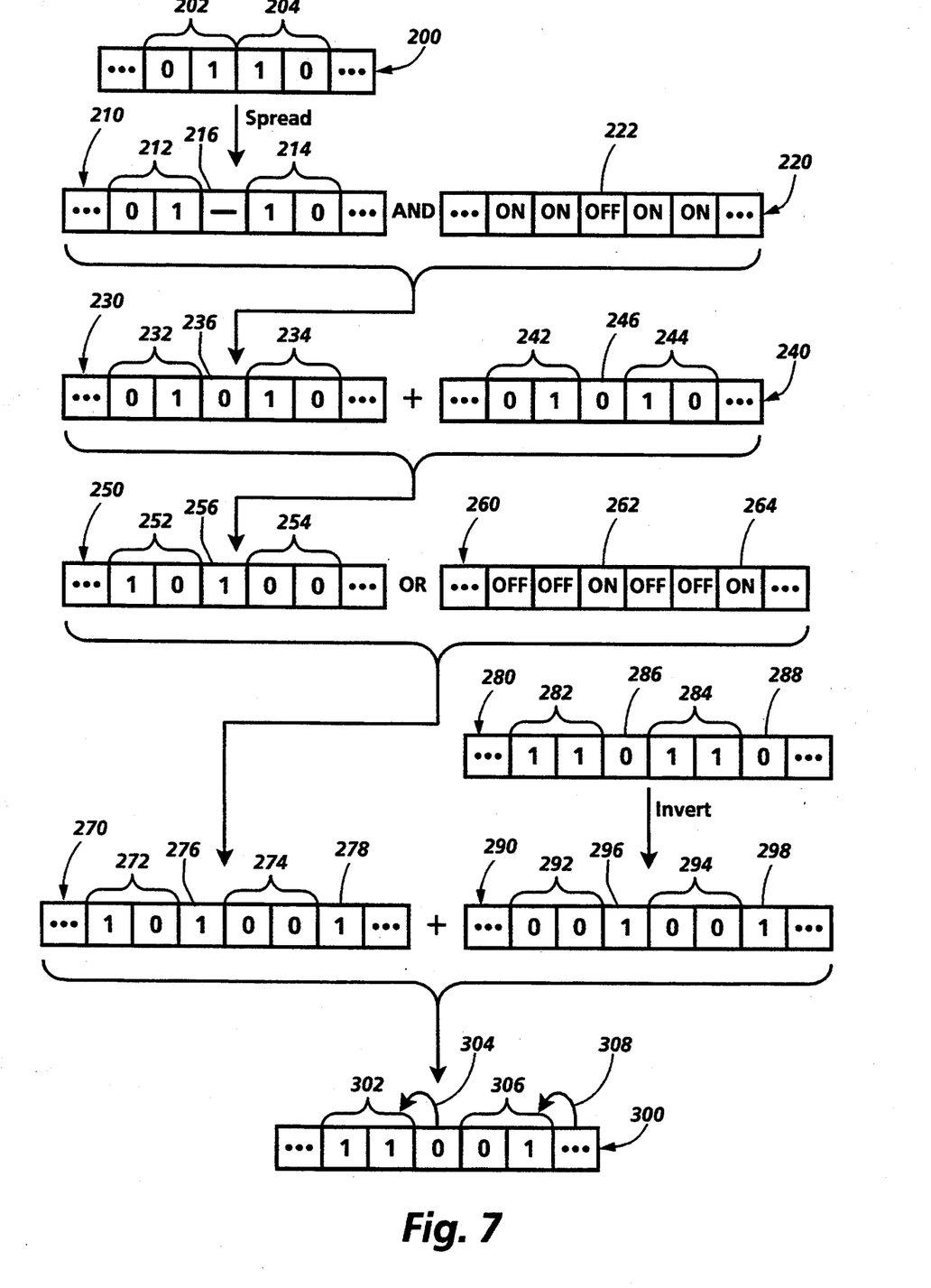
FIG. 7 is a schematic flow diagram showing an addition operation and a subtraction operation, each implementing the acts in FIG. 4.
Figure 8:
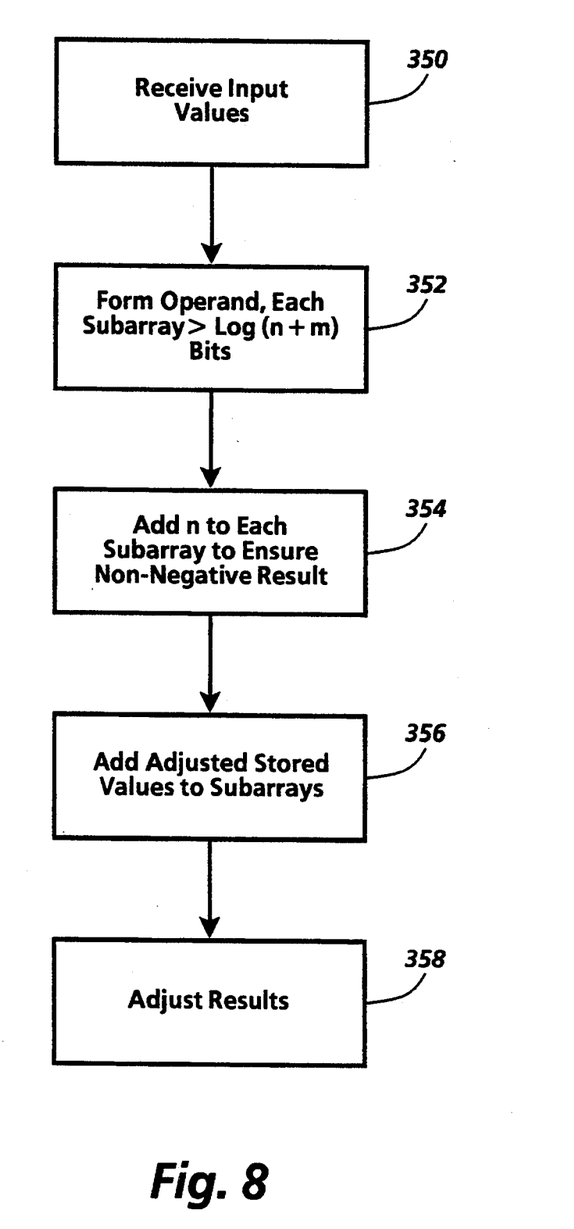
FIG. 8 is a flow chart showing a biasing approach that implements the acts in FIG. 4.

FIGS. 5 and 6 illustrate two implementations of the general components shown in FIG. 3. FIGS. 7 and 8 illustrate two implementations of the general steps shown in FIG. 4 that are applicable for processing units that can operate in parallel on more than one data item; a number of such processing units could be used in parallel without position connecting circuitry between them.

1. Gating Circuitry

FIG. 5 illustrates an implementation of the general components described in relation to FIG. 3 that can employ conventional microprocessors in processing circuitry 102. The implementation in FIG. 5 includes inter-component prevent circuitry 110 that can prevent an inter-component signal between the microprocessors. Therefore, if each microprocessor is M bits wide, where $M \geq -1$, the array of processing positions can be divided into subarrays at any integer multiple of M bits. Each subarray can then perform arithmetic operations on component data items.

FIG. 5 shows microprocessor 150, the pth microprocessor in an array of microprocessors that provides processing positions 104. Within the array, position connecting circuitry 106 connects the carry in and carry out leads of adjacent microprocessors. As shown, however, the carry in lead of microprocessor 150 receives a signal from the carry out lead of the (p−1)th microprocessor only if a carry select signal is provided to AND gate 152. Similarly, a signal from the carry out lead of microprocessor 150 is provided to the (p+1)th microprocessor only if a carry select signal is provided to AND gate 154.

Width-to-select decoder 156 can be a read only memory (ROM), programmable array logic (PAL), or other conventional circuitry that responds to a signal from control circuitry 112 by providing carry enable signals to the appropriate AND gates so that carry signals can be transferred within a subarray but not between subarrays of different component data items. The signal from control circuitry 112 can indicate a subarray width, such as M, 2M, 3M, and so forth, and the output from width-to-select decoder 156 can accordingly be ON for AND gates within a subarray and OFF for AND gates between subarrays. To perform an operation on an array-wide value, which is useful for tasks that tend to generate large numbers such as pixel counting, the signal from control circuitry 112 can indicate a width such that the output from width-to-select decoder 156 provides an ON output to all AND gates.

2. Mask Register

FIG. 6 illustrates another implementation of the general components described in relation to FIG. 3 that can employ a customized arithmetic logic unit (ALU) 170. The implementation in FIG. 6 includes inter-component prevent circuitry that can prevent an inter-component signal between any two adjacent processing positions within ALU 170. Therefore, if ALU 170 is M bits wide, the array of processing positions can be divided into equal subarrays at any integer factor of M bits. Each subarray can then perform arithmetic operations on component data items.

Processing position 172 is the pth position in processing positions 104 within ALU 170. Within the array, position connecting circuitry as in FIG. 3 connects carry in and carry out leads of adjacent processing positions. As shown, however, the carry in lead of position 172 receives a signal from the carry out lead of the (p−1)th position through position connecting logic 174. Similarly, the carry out lead of position 172 provides a signal to the carry in lead of the (p+1)th position through position connecting logic 176.

Position connecting logic 174 provides a carry in signal from the (p−1)th position only if an ON value is provided to the other input lead of AND gate 180, so that the signal is provided to the carry in lead of position 172 through OR gate 182. When the mask register provides an OFF signal to AND gates 180 and 184, the carry in lead of position 172 receives an ON signal only if the subtract signal to AND gate 184 is ON. Position connecting logic 176 includes similar circuitry.

Mask register 190 can be implemented with conventional register circuitry that can be loaded with mask values by signals from control circuitry 112. The mask values include enable values, illustratively ON, and prevent values, illustratively OFF. Mask register 190 is connected so that each mask value is provided to AND gates that control the carry in line of a respective position like AND gates 180 and 184. Mask value 192 controls the carry in line of the (p−1)th position, mask value 194 the carry in line of the pth position, and mask value 196 the carry in line of the (p+1)th position. In general, an enable value allows a carry out signal from the next lower position to propagate upward, while a prevent value prevents upward propagation of carry out signals. But during a subtraction operation, a prevent value provides a carry in signal even if the next lower position is not providing a carry out signal, as required by the standard implementation of two's complement arithmetic.

Control circuitry 112 can load mask register 190 each time the number of bits in each component data item changes. For instance, if the component data items are pixel values, mask values can be changed whenever the number of bits in each pixel value changes.

In the illustrated example, mask value 192 controls the uppermost processing position of one component's subarray, while mask value 194 controls the lowermost processing position of an adjacent component's subarray, which is position 172.

Each of the above implementations employs special circuitry. In contrast, the following implementations do not require special circuitry, but may use processing positions less efficiently than the above implementations due to additional bits such as buffer bits.

3. Buffer Bits

FIG. 7 is a flow diagram illustrating two implementations of the general acts described in relation to FIG. 4 that employ extra bits, called buffer bits, between component data items. The first implementation, illustrated by operands 200 through 250, performs an addition operation, the second, illustrated by operands 250 through 300, performs a subtraction operation.

Composite operand 200 includes a plurality of component data items. As shown, components 202 and 204 are adjacent to each other within operand 200.

A spread operation can be performed on operand 200 to obtain composite operand 210. Operand 210 includes component 212 with the same value as component 202 and component 214 with the same value as component 204. In addition, operand 210 includes buffer bit 216 between components 212 and 214.

In general, any spread operation can be used that uses a composite operand to obtain another composite operand that includes one or more buffer bits between adjacent component data items. For example, a spread operation could be implemented using spreading circuitry as described in copending coassigned U.S. patent application Ser. No. 07/993,939, pending, entitled "Subsampling and Spreading Circuitry for SIMD Architecture," incorporated herein by reference. The number of buffer bits could be large enough to ensure that the resulting data item produced in each component's subarray would not affect an adjacent subarray, but this may be inefficient.

For maximum efficiency, the number of buffer bits should preferably be kept at a minimum.

If an M-bit microprocessor is being used, for example, and each component data item includes ((M/n)−1) bits or less, where n is an integer, then n components can be included in one M-bit composite operand if one buffer bit can be inserted at or adjacent the least significant bit or at or adjacent the most significant bit of every component data item. In these cases, all arithmetic can be done MOD $2^{n-1}$.

If buffer bits are inserted by spreading components, range and resolution of component values are preserved but additional processing positions are used for buffer bits. If buffer bits replace least significant bits of components, precision or resolution of component values is sacrificed. If buffer bits replace most significant bits, the range of component values is reduced by half.

In addition, a buffer bit at or adjacent the most significant bit may conveniently be used to indicate a binary result of an arithmetic operation for a pixel, as described in copending coassigned U.S. patent application Ser. No. 07/993,213, now U.S. Pat. No. 5,375,080, entitled "Performing Arithmetic on Composite Operands to Obtain a Binary Outcome for Each Multi-bit Component," incorporated herein by reference.

If each component data item includes more than ((M/n)−1) but not more than (M/n) bits, and if some precision can be sacrificed, then n component data items can be included in one M-bit composite operand if the least significant bits of some or all components are used as buffer bits. In this case, arithmetic operations are performed on even numbers only.

Before an addition operation that adds aligned components in two composite operands, each buffer bit in both operands should be cleared to zero to prevent propagation of carry signals from one component's subarray to another's. Therefore, operand 210 is ANDed with operand 220, a mask operand that is ON in every bit position in a component's subarray and is OFF in every buffer bit position, as shown by bit 222.

The AND operation produces composite operand 230, with component 232 having the same value as component 212 and with component 234 having the same value as component 214. Buffer bit 236 has the value zero.

The addition operation adds composite operand 230 to composite operand 240, the relevant part of which is illustratively shown as identical to operand 230, with components 242 and 244 the same as components 232 and 234 and with buffer bit 246 the same as buffer bit 236. Operand 240 could be obtained by copying operand 230 or could be obtained by acts similar to those described above. If a constant was being added to each component in a composite operand, the constant operand could be obtained starting with an all-zero operand with which the constant could be ORed at the position of each component's subarray.

Addition of operands 230 and 240 produces composite operand 250, with a resulting data item in each component's subarray. Resulting data item 252 indicates a valid result of adding components 232 and 242, while resulting data item 254 indicates a valid result of adding components 234 and 244. Buffer bit 256 has the value one because of carry signal 258 received from the subarray in which components 234 and 244 are added, but buffer bit 256 has ensured that resulting data items 252 and 254 indicate valid results. If another addition were performed, buffer bit 256 would be cleared again before adding.

Operands 200 through 250 thus illustrate an implementation of the acts in FIG. 4. Operands 200, 210, 230, and 240 illustrate how each component data item is provided to a subarray. Operands 230, 240, and 250 illustrate how an arithmetic operation is performed in parallel to obtain valid results despite an inter-component signal, carry signal 258.

A two's complement subtraction operation can be implemented by inverting a subtrahend and adding to it a minuend plus a carry to produce a difference between the minuend and the subtrahend. Therefore, to obtain a valid result for each component, it is necessary to add a carry into each resulting data item. This can be done using buffer bits, provided that the buffer bits in both the minuend operand and the inverted subtrahend operand have the value one, so that they are certain to produce a carry signal to the next subarray.

In FIG. 7, composite operand 250 is the minuend operand, but it may have zeros in some buffer bits. Therefore, to prepare it for a subtraction operation, it is ORed with operand 260, a mask operand that is OFF in every bit position in a component's subarray and is ON in every buffer bit position, as shown by bits 262 and 264. Mask 260 can be seen to be the complement of mask 220. An implementation can store one of the two masks, inverting as required to obtain the other.

The OR operation produces composite operand 270, with component 272 having the same value as component 252 and with component 274 having the same value as component 254. Buffer bits 276 and 278 have the value one.

Composite operand 280 is the subtrahend, illustratively obtained by O-Ring a constant 11 with each subarray in an all-zero operand, so that constant data items 282 and 284 each have the value 11 and buffer bits 286 and 288 each have the value zero. The subtrahend must be obtained such that all buffer bits have the value zero. Then, operand 280 is inverted to obtain operand 290, in which constant data items 292 and 294 each have the value 00 and buffer bits 296 and 298 each have the value one. The inversion operation is conventionally performed by an arithmetic logic unit (ALU) as part of a two's complement subtraction operation so it need not be implemented in code.

An addition operation then adds operand 270 to operand 290 to obtain operand 300, with a resulting data item in each subarray. Resulting data item 302 indicates a valid result of subtracting constant data item 282 from component 252 because of carry signal 304, while resulting data item 306 indicates a valid result of subtracting constant data item 284 from component 254 because of carry signal 308.

Operands 250 through 300 thus illustrate an implementation of the acts in FIG. 4. Operands 250, 270, 280, and 290 illustrate how each component data item is provided to a subarray. Operands 270, 290, and 300 illustrate how an arithmetic operation is performed in parallel to obtain valid results despite inter-component signals, carry signals 304 and 308.

As described in copending coassigned U.S. patent application Ser. No. 07/993,938, pending, entitled "Masks for Selecting Multi-bit Components in a Composite Operand," incorporated herein by reference, multiplication and division operations can also be performed using buffer bits together with techniques that produce masks.

4. Biasing

FIG. 8 illustrates another implementation of the general acts described in relation to FIG. 4 that biases values of component data items. This implementation depends on constraints applied to values of composite operands.

The act in box 350 receives input values. These values are constrained to positive numbers with no more than q bits, so that they can range from 0 to $2^q$. The implementation shown in FIG. 8 performs an arithmetic operation that adds a stored value, such as a value from a table, to each input value, and the stored values are similarly constrained to positive or negative numbers with no more than r bits, ranging between $\pm(2^{r-1}-1)$. If $q=r=4$, for example, input values can range from zero to 15 while stored values can range from $-7$ to $+7$. In this example, the arithmetic operation can obtain values ranging from $-7$ to $+22$. In general, an arithmetic operation that adds a stored value to an input value can obtain values ranging from $-n$ to $+m$ where n and m are positive integers.

The act in box 352 forms a composite operand with a subarray for each input value. All subarrays can be of the same length, which must exceed $\log_2(n+m)$.

The act in box 354 biases the components by adding n to the value in each subarray, ensuring a non-negative result when a stored value is added to the subarray. The act in box 356 then adds a stored value to each subarray, obtaining values that can range from zero to $(n+m)$.

The stored values added by the act in box 356 must be adjusted to ensure that carry signals do not lead to invalid results. In the example set forth above, the adjustment can be done by scanning the stored values to be added to the composite operand leftward from the least significant end to the most significant end. If a stored value is less than zero, as indicated by a one in its most significant bit, one is subtracted from the next stored value to the left. This procedure is effective because each negative stored value would produce a carry signal while none of the non-negative stored values would. As a result of this adjustment, the carry signals produced by adding negative stored values lead to valid results.

The act in box 358 then adjusts the results from box 356. The act in box 358 could, for example, subtract n from each subarray, reversing the act in box 354. As a result, each subarray would include a valid result of adding an input value received in box 350 to a stored value prior to the adjustment referred to in box 356. The subtraction in box 358 could be done in more than one way. One way would be to handle each subarray separately; the value in each subarray could be used to access a lookup table to obtain another value reduced by n from the value in the subarray. Another way would be to provide a lookup table for the result from box 356. Other adjustments could be made as desired, to truncate or otherwise obtain data suitable for subsequent operations.

The implementation of FIG. 8 would be useful for adding entries from a table, as in dithering pixel values. It could be extended for use in other situations.

D. Applications

The general implementation features described above could be used in a wide variety of data processing applications. They are expected to be particularly useful, however, in performing some types of image processing more rapidly than they could be performed serially on each component data item. In particular, the features described above could be used to implement techniques similar to those described in Serra, J., *Image Analysis and Mathematical Morphology*, Academic Press, 1982 and Serra, J., *Image Analysis and Mathematical Morphology*, Volume 2: *Theoretical Advances*, Academic Press, 1988. Such techniques may be used, for example, to provide document services, such as removal of noise or other non-informative features, skew correction, data encoding, extraction of segments for automatic form or control sheet creation, and printer specific correction. Such document services can be used in digital copying machines, including fax machines and photocopying machines, in machines that produce data defining an image for a printer or other image output device, in machines that operate on data defining an image received from a scanner or other image input device, and in other machines that perform image processing.

The features described above can be used to perform arithmetic operations on gray scale or color pixel values during a wide variety of image processing operations.

The general implementation features described above may also be useful in various other applications, such as searching an image database for images containing a particular set of features; scanning envelopes for addresses; interpreting forms from a high-speed scanner; machine vision; and process-specific print image correction and verification.

The invention could also be applied to perform various other image processing operations, such as pixel counting, gray scale morphology, gray scale rotation, generating error-diffused images, and skew detection.

The invention could also be used with data that does not relate to an image. The invention could be used, for example, to perform finite difference analysis or simulations of physical phenomena.

E. Miscellaneous

The invention has been described in relation to several implementations. The invention might also be implemented by using two or more of the implementations together.

The invention has been described in relation to implementations in which component data items in an composite operand are separated by single buffer bits. The invention could also be implemented with plural buffer bits between component data items.

The invention has been described in relation to inter-component prevent circuitry that includes gating circuitry or a mask register. The invention might also be implemented with other types of inter-component prevent circuitry. If used with a processor that provides carry look-ahead signals or other such signals, the inter-component prevent circuitry could also prevent such signals from causing invalid results.

The invention has been described in relation to addition and subtraction, but could be applied to other arithmetic operations, including multiplication, division, and threshold convolution, as described in copending coassigned U.S. patent application Ser. No. 07/993,938, pending, entitled "Masks for Selecting Multi-bit Components in a Composite Operand," incorporated herein by reference.

The invention has been described in relation to implementations that operate on data relating to images, but might also be implemented to operate on data that does not relate to an image.

The invention has been described in relation to implementations that include readily available discrete components. The invention might also be implemented with custom VLSI components, and similarly with custom memory components.

The invention has been described in relation to implementations with conventional microprocessors, but the invention might also be implemented with reduced instruction set (RISC) chips or with any other processor, including the processor of a mainframe computer, minicomputer, supercomputer, or any other computing device.

The invention has been described in relation to composite operands with simple structures. In the examples described above, all component data items are of the same length and the components within a composite operand need not be related to each other. The invention could also be implemented with composite operands with additional structure, within the limitations of processor width. For example, a composite operand could include component data items of different widths, provided that other operands are aligned with components of the same widths in the same positions. Also, the component data items could be arranged in groups of two or more, with the components in each group being related: If the components in each group relate to the same pixel, each component could hold a value for a respective threshold reduction. More generally, if the components in each group relate to the same location in a physical simulation space, one component could hold a value for the location and the other locations could hold derivatives at the location.

Although the invention has been described in relation to various implementations, together with modifications, variations, and extensions thereof, other implementations, modifications, variations, and extensions are within the scope of the invention. The invention is therefore not limited by the description contained herein or by the drawings, but only by the claims.

What is claimed is:
1. A method of operating a processor;
the processor including processing circuitry for performing arithmetic operations in parallel on operands; the processing circuitry having two or more processing positions, each for performing operations on one bit; the processing circuitry comprising position connecting circuitry connecting the processing positions in pairs to form an array of processing positions; the position connecting circuitry connecting each pair of processing positions so that a signal from one of the processing positions in the pair can be transferred to the other processing position in the pair;
the method comprising acts of:
providing to the processing circuitry a composite operand that includes two or more component data items, each including more than one bit; each component data item being provided to a respective subarray of processing positions in the processing circuitry; and operating the processing circuitry to perform an arithmetic operation in parallel on the composite operand; the arithmetic operation obtaining, in the subarray of each component data item, a respective resulting data item; the subarray of a first one of the component data items providing an inter-component signal to position connecting circuitry connecting to a receiving processing position that is not in the subarray of the first component data item during performance of the arithmetic operation;

the component data items being ordered in a sequence, each pair of adjacent component data items in the sequence being separated by at least one buffer bit whose value can be modified to ensure that each resulting data item indicates a valid result despite the inter-component signal; the act of providing a composite operand comprising providing one of the buffer bits to the receiving processing position; the act of operating the processing circuitry comprising obtaining a value in the receiving processing position so that the receiving processing position does not respond to the inter-component signal by providing a signal to the position connecting circuitry and so that each resulting data item indicates a valid result of the arithmetic operation on the respective component data item despite the inter-component signal.

2. The method of claim 1 in which each pair of adjacent component data items in the sequence is separated by one buffer bit.

3. The method of claim 2 in which each component data item has a least significant bit; the least significant bit of each component data item being a buffer bit.

4. A method of operating a processor;

the processor including processing circuitry for performing arithmetic operations; the processing circuitry having four or more processing positions, each for performing operations on one bit; the processing circuitry comprising position connecting circuitry connecting the processing positions to form an array of processing positions; the array including a lowest position and three or more higher positions; each higher position having a next lower position; the position connecting circuitry connecting each higher position to its next lower position so that a signal from the next lower position can be transferred to the higher position;

the method comprising:

providing to the processing circuitry first and second composite operands; the first and second composite operands each including two or more component data items, each including more than one bit; each component data item being provided to a respective subarray of processing positions in the array; each component data item including a least significant bit position and a most significant bit position; the component data items including a lowest component data item and at least one higher component data item; each higher component data item having a next lower component data item; the act of providing first and second composite operands comprising:

providing the least significant bit of the lowest component data item of each of the first and second composite operands to the lowest position in the array;

providing the least significant bit of each higher component data item of the first and second composite operands to one of the higher positions in the array so that the least significant bit of a first one of the higher component data items of the second composite operand is in the position of the least significant bit of a first one of the higher component data items of the first composite operand and so that the subarray of the first higher component data item of the second composite operand is aligned with the subarray of the first higher component data item of the first composite operand; and providing the most significant bit of the next lower component data item of the first higher component data item of each of the first and second composite operands to the next lower position of the first higher component data item's least significant bit so that the subarray of the first higher component data item is connected by the position connecting circuitry to the subarray of its next lower component data item and so that the subarray of the next lower component data item of the first higher component data item of the second composite operand is aligned with the subarray of the next lower component data item of the first higher component data item of the first composite operand;

operating the processing circuitry so that a buffer position in one of the subarrays of the first higher component data item of the first composite operand and its next lower component data item has a first operand buffer value and so that a buffer position in one of the subarrays of the first higher component data item of the second composite operand and its next lower component data item has a second operand buffer value; the buffer position in the second composite operand being aligned with the buffer position in the first composite operand; and operating the processing circuitry to perform an arithmetic operation in parallel on the first and second composite operands; the arithmetic operation obtaining, in the subarray of each component data item of the first and second composite operands, a respective resulting data item; the buffer value in the buffer position ensuring that the resulting data item in the subarray of one of the first higher component data item of the first and second composite operands and its next lower component data item indicates a valid result of the arithmetic operation.

5. The method of claim 4 in which the first operand buffer value is zero.

6. The method of claim 4 in which the first operand buffer value is one.

7. The method of claim 4 in which the buffer position is the position of the first higher component data item's least significant bit.

8. The method of claim 4 in which the buffer position is the position of the most significant bit of the next lower component data item of the first higher component data item.

9. The method of claim 4 in which the arithmetic operation is addition; the first and second operand buffer values being zero.

10. The method of claim 4 in which the arithmetic operation is subtraction; the first operand buffer value being one; the second operand buffer value being zero.

11. The method of claim 4 in which each component data item of the second composite operand has a constant value so that the second composite operand includes replications of the constant value separated by buffer positions.

12. The method of claim 11 in which the first and second operand buffer values are both zero.

13. The method of claim 11 in which the first and second operand buffer values are both one.

14. The method of claim 4 in which the first operand buffer value is one and the second operand buffer value is zero; the act of operating the processing circuitry to perform an arithmetic operation comprising:
operating the processing circuitry to perform a subtraction operation in parallel on the first and second composite operands with the first composite operand being a composite minuend and the second composite operand being a composite subtrahend; the subtraction operation obtaining, in each subarray, a respective difference data item; the values in the buffer positions of the first and second composite operands ensuring that the difference data item in a first one of the subarrays indicates a valid result of the subtraction operation.

15. The method of claim 14 in which the act of operating the processing circuitry to perform a subtraction operation comprises:
inverting the second composite operand so that the buffer position in the inverted second composite operand has a value of one; and
adding the first composite operand and the inverted second composite operand to obtain a composite difference data item that includes, in each subarray, a respective difference data item indicating a valid result of the subtraction operation.

* * * * *